(12) United States Patent
Park et al.

(10) Patent No.: US 12,197,988 B2
(45) Date of Patent: Jan. 14, 2025

(54) LOGISTICS SMART LABEL, SMART BOX AND LOGISTICS SYSTEM INCLUDING THE SAME

(71) Applicant: Hyunsung Co., Ltd., Busan (KR)

(72) Inventors: Boung Kang Park, Anyang-si (KR); Hang Seok Choi, Seongnam-si (KR)

(73) Assignee: Hyunsung Co., Ltd., Busan (KR)

( * ) Notice: Subject to any disclaimer, the term of this patent is extended or adjusted under 35 U.S.C. 154(b) by 106 days.

(21) Appl. No.: 18/079,907

(22) Filed: Dec. 13, 2022

(65) Prior Publication Data

US 2024/0070431 A1    Feb. 29, 2024

(30) Foreign Application Priority Data

Aug. 25, 2022  (KR) .................. 10-2022-0106887
Nov. 18, 2022  (KR) .................. 10-2022-0155238

(51) Int. Cl.
*G06K 19/077* (2006.01)
*B65D 23/14* (2006.01)

(52) U.S. Cl.
CPC ....... *G06K 19/07773* (2013.01); *B65D 23/14* (2013.01)

(58) Field of Classification Search
None
See application file for complete search history.

(56) References Cited

U.S. PATENT DOCUMENTS

| | | | | |
|---|---|---|---|---|
| 2001/0054964 A1* | 12/2001 | Popp | ....................... | B64D 37/32 340/584 |
| 2008/0111696 A1* | 5/2008 | Chisholm | .............. | B65D 23/14 340/572.8 |
| 2008/0272131 A1* | 11/2008 | Roberts | ..................... | G01K 1/14 374/E1.004 |

(Continued)

FOREIGN PATENT DOCUMENTS

| | | | | |
|---|---|---|---|---|
| DE | 102014223282 A1 * | 5/2016 | ............ | B65D 79/02 |
| KR | 10-2009-0000108 A | 1/2009 | | |

(Continued)

OTHER PUBLICATIONS

Office Action of Korean Patent Application No. 10-2022-0155238 mailed Jul. 22, 2024.

*Primary Examiner* — Muhammad Adnan
(74) *Attorney, Agent, or Firm* — Revolution IP, PLLC

(57) ABSTRACT

The present invention relates to a logistics smart label, a smart box, and a logistics system including the same, including: a smart label member that is mounted on a logistics box, provided with at least one bending line, and mounted on an outside and inside of the logistics box through bending along the bending line, in which the smart label member may be partitioned along the bending line into an externally mounted label area that is mounted outside the logistics box and includes at least one first sensor unit and a first antenna, and an internally mounted label area that is bent along the bending line to be mounted inside the logistics box, and includes at least one second sensor unit (Continued)

and a second antenna connected to the first antenna. In addition, the logistics smart label, smart box, and logistics system including the same may be implemented in various ways according to embodiments.

11 Claims, 13 Drawing Sheets

(56) References Cited

U.S. PATENT DOCUMENTS

| | | | | |
|---|---|---|---|---|
| 2010/0012653 | A1* | 1/2010 | Ulrich | B65D 81/3825 |
| | | | | 220/1.5 |
| 2010/0052215 | A1* | 3/2010 | Emond | B29C 45/14065 |
| | | | | 264/275 |
| 2011/0291806 | A1* | 12/2011 | Hoofman | G01N 33/0062 |
| | | | | 340/10.1 |
| 2012/0138565 | A1* | 6/2012 | Yu | B65D 23/14 |
| | | | | 215/386 |
| 2020/0328485 | A1* | 10/2020 | Volkmann | H01M 10/63 |
| 2020/0353961 | A1* | 11/2020 | Bonnes | G01S 19/50 |

FOREIGN PATENT DOCUMENTS

| KR | 10-2019-0036756 A | 4/2019 |
|---|---|---|
| KR | 10-2138488 B1 | 7/2020 |
| KR | 10-2021-0135671 A | 11/2021 |
| KR | 10-2022-0042844 A | 4/2022 |

* cited by examiner (a)    (b)

(c)    (d)

(a)    (b)

(c)    (d)

(a)          (b)

(c)

(a)

(b)

(a)

(b)

LOGISTICS SMART LABEL, SMART BOX AND LOGISTICS SYSTEM INCLUDING THE SAME

CROSS-REFERENCE TO RELATED APPLICATION

This application claims priority to and the benefit of Korean Patent Application Nos. 10-2022-0106887 filed on Aug. 25, 2022 and 10-2022-0155238 filed on Nov. 18, 2022, the disclosure of which are incorporated herein by reference in their entirety.

BACKGROUND

1. Field of the Invention

The present invention relates to a logistics smart label having a thermoelectric energy harvesting function, a smart box, and a logistics system including the same capable of implementing theft detection and fire detection of logistics, implementing three-dimensional antenna performance, improving positioning accuracy by averaging location information of a smart label, and maximizing an operation time through thermoelectric harvesting using an internal/external temperature difference.

2. Discussion of Related Art

Products such as produced goods or boxed packages go through many logistics stages before reaching users. A logistics system may vary depending on products, courier companies, or the like, but an approximate process is to classify products according to delivery locations, product contents, etc., move the classified products to transportation means such as containers or trucks, transport the products to logistics centers across the country, and supply the products from the logistics centers to destinations.

For speed, accuracy, ease, or the like of these delivery systems, recently, devices, systems, etc., capable of managing logistics and confirming locations or delivery of the logistics by transmitting data to a logistics management server when logistics containers are received/shipped by attaching electronic tags such as RFID to logistics have been spreading.

As described above, various smart labels including electronic tags are electronic labels, and may be attached to products constituting a part of logistics to check a mass flow of logistics in real time and update a fluctuation situation of logistics in real time. The smart label is used in radio frequency identification, which was developed to compensate for shortcomings of logistics identification using a wired reader and a barcode. The radio frequency identification is a system of identifying a smart label or a tag attached to a product through a radio signal from a reader and transmitting data to a host.

The smart label includes an IC chip and an antenna that transmits and receives data to and from a reader. The smart label may be used for various types of logistics information management, such as library management and warehouse management.

In particular, as awareness of the safety of logistics from risks such as logistics security or fire is emphasized from focusing only on the speed of logistics, the need for a smart label or a smart box and a logistics system including the same is required for safe logistics transportation.

Related Document 1 relates to a logistics management system and method using active and passive radio identification tags, and more specifically, to a logistics management system and method capable of identifying inventory in real time through entry and exit of products by attaching passive RFID tags to each product and tracking entry and exit of containers and locations of the containers in real time by attaching active RFID tags to the containers.

However, although Related Document 1 relates to a system capable of identifying inventory of logistics and tracking locations of containers in real time, the system does not have a configuration that can identify internal conditions such as temperature, humidity, impact, and vibration of logistics, and therefore it is difficult to identify the causes of accidents due to changes in external environment.

In addition, the conventional smart label is attached only to an outer surface of a logistics box, and therefore cannot perform internal illumination sensing when boxes are opened. As described above, there is a problem in that the conventional smart label cannot detect changes in external environment, for example, with a fire detection function, has a two-dimensional antenna structure that limits performance implementation, cannot perform Global Positioning System (GPS) reception in many cases and therefore has low accuracy when applying cell ID positioning technology, and does not have a harvest function.

For example, the smart label is attached to the outer surface of the logistics box, and thus can detect the opening, damage, etc., of the attached surface of the smart label, but cannot detect the opening, damage, etc., of other parts of the logistics box.

In addition, when a fire occurs in a logistics warehouse, etc., or a fire due to an accident of a delivery vehicle in a logistics delivery process occurs, there is a problem in that the fire may not be detected, the initial suppression rate of the fire may be low, a false alarm may frequently occur even when there is no fire, or a fire that occurs inside cargo may not be detected.

In addition, since the smart label needs to implement an antenna on a two-dimensional plane, it is difficult to implement uniform performance in a wide frequency band.

Therefore, there is an urgent need for a logistics smart label, a smart box, and a logistics system including the same capable of monitoring an internal state of logistics and a logistics transportation environment by detecting vibration, impact, or the like applied to the logistics as well as locating the logistics.

RELATED ART DOCUMENT

Patent Document

Patent Document 1: KR Laid-Open Publication No. 10-2009-0000108 (Jan. 7, 2009)
Patent Document 2: KR Patent No. 10-2138488 (Jul. 21, 2020)

SUMMARY OF THE INVENTION

The present invention is directed to providing a logistics smart label, a smart box, and a logistics system including the same capable of monitoring an internal state of logistics and a logistics transportation environment by detecting vibration, impact, or the like applied to the logistics as well as locating the logistics.

Objects of the present invention are not limited to the objects described above, and other objects that are not mentioned may be obviously understood by those skilled in the art from the following description.

According to an aspect of the present invention, there are provided a logistics smart label, a smart box, and a logistics system including the same, including: a smart label member that is mounted on a logistics box, provided with at least one bending line, and mounted on an outside and inside of the logistics box through bending along the bending line, in which the smart label member may be partitioned along the bending line into an externally mounted label area that is mounted outside the logistics box and includes at least one first sensor unit and a first antenna, and an internally mounted label area that is bent along the bending line to be mounted inside the logistics box, and includes at least one second sensor unit and a second antenna connected to the first antenna.

A battery module providing power may be mounted on the smart label member.

The smart label member may include: a first label layer that is attached to be exposed on the outside of the logistics box, and has one side forming the externally mounted label area along the bending line and the other side attached to an outer side surface of the logistics box, and a second label layer that is formed to be partitioned into two compartments along the bending line, and the second label layer may have one side stacked on a lower surface of the first label layer along the bending line, and the other side bent while forming the internally mounted label area along the bending line and located inside the logistics box.

The other side of the second label layer may be bent at one side of the label layer along the bending line and attached to an inner lower surface of an open cover of the logistics box.

The first label layer may be detachably provided on the second label layer.

The first sensor unit may include an illuminance sensor and a temperature sensor, and the second sensor unit may include at least one of a temperature and humidity sensor, an illuminance sensor, an impact sensor, and/or an acceleration sensor.

The smart label may further include a harvest module that generates power through an internal and external temperature difference of the housing, and the harvest module may further include: a base member made of a metal material that has one surface mounted on an outer side surface of the logistics box along a bending line corresponding to the bending line and the other surface mounted inside the logistics box and having the smart label member bent and mounted thereon from a predetermined location on the one surface to the other surface; a top member of a metal material that is located on the one surface of the base member and is laminated on an upper surface of the base member adjacent to the smart label member; and a thermoelectric device that is provided between the base member and the top member to generate power according to an internal and external temperature difference of the logistics box.

The smart label may further include a cutout part that is cutout from a predetermined location of the bending line to the other end of the smart label member, in which one of upper or lower surfaces partitioned by the cutout part may be provided as the externally mounted label unit, and the other of the upper or lower surfaces partitioned by the cutout part may be provided as the externally mounted label unit.

When a temperature change rate in one of the logistics boxes having the smart label is equal to or greater than a set value, a fire may be detected by analyzing temperature change rates of at least one or more logistics boxes near the logistics box.

The temperature change rate through the smart label may be detected according to Equation 1 below.

Temperature change rate=current temperature difference $D\ T_p$–initial temperature difference $D\ T_0$, ($D\ T$=external temperature $T_{out}$–internal temperature $T_{in}$) Equation 1

According to another aspect of the present invention, there are provided a logistics smart label, a smart box, and a logistics system including the same, the smart box including a housing that houses goods and a smart label that is mounted on the housing, in which the smart label may include a first label that is mounted on an outer side surface of the housing and includes at least one first sensor unit, a first antenna, and a connector, and a second label that is mounted on an inner side surface of the housing, and includes at least one second sensor unit inside the housing, a second antenna connected to a first antenna, and a connection connector connected to the connector.

A battery module may be further provided on the second label.

The first sensor unit may include at least one of a temperature and humidity sensor, an illuminance sensor, an impact sensor, and/or an acceleration sensor, and the second sensor unit may include the illuminance sensor and the temperature sensor.

The smart label may further include a harvest module that generates power through an internal and external temperature difference of the housing, and the harvest module may include: a base member made of a metal material that is bent along a bending line, and has one surface mounted on an upper surface of the housing, a first label mounted on the upper surface thereof, and the other surface mounted inside the housing; a top member made of a metal material that is stacked on the upper surface of the base member; and a thermoelectric device that is provided between the base member and the top member to generate power according to an internal and external temperature difference of the logistics box.

According to still another aspect of the present invention, there are provided a logistics smart label, a smart box, and a logistics system including the same, including: a analyzing an internal and external temperature difference and/or illuminance difference of a logistics box through a sensor unit provided in a smart label member mounted inside and outside the logistics box; determining whether the internal and external temperature difference or/and illuminance difference of the logistics box is within a theft criterion range; determining whether the internal and external temperature difference of the logistics box is within a fire criterion range; and determining a temperature change rate of the smart label member mounted in the logistics box adjacent to the logistics box.

Detailed content of other embodiments is described in the detailed description and illustrated in the drawings.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
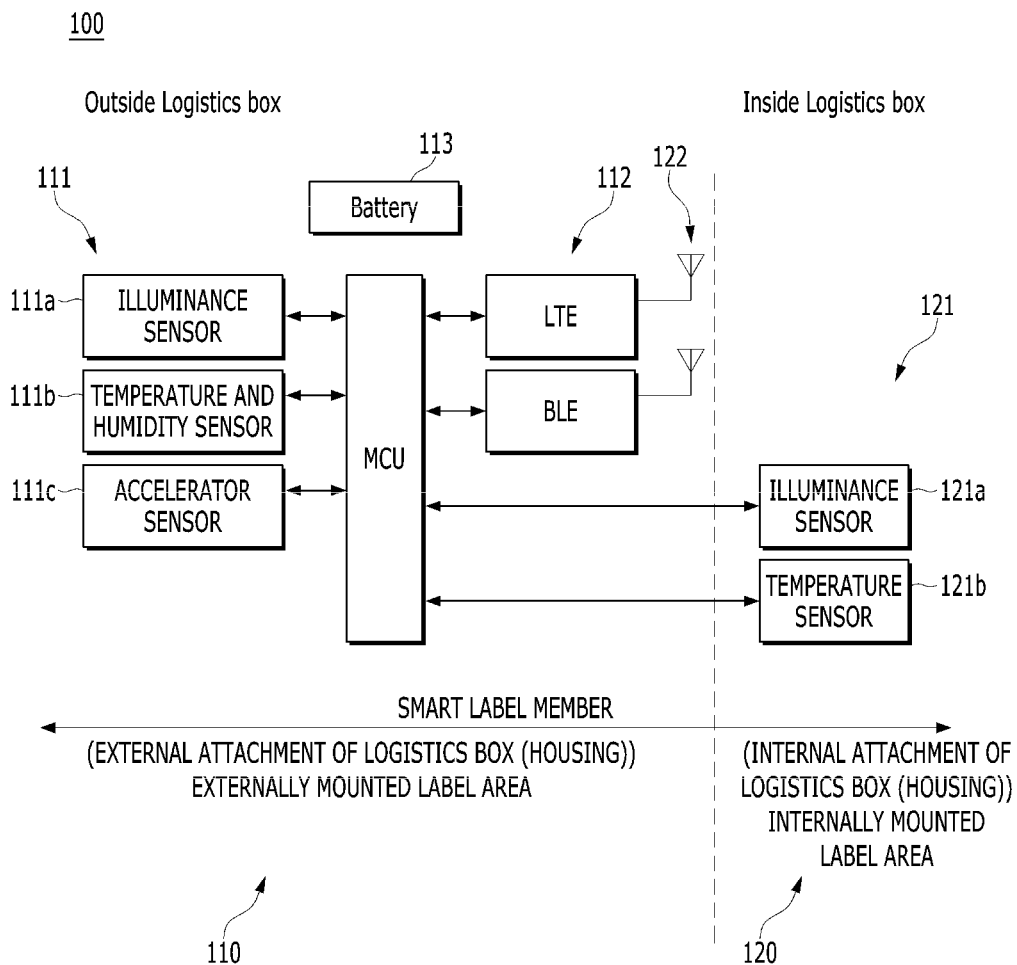
FIG. 1 is a schematic block diagram of a logistics smart label according to an embodiment of the present invention.

Advantages and features of the present disclosure and methods for accomplishing these advantages and features will become apparent from embodiments to be described later in detail with reference to the accompanying drawings. However, the present disclosure is not limited to embodiments to be described below, but may be implemented in various different forms, these embodiments will be provided only in order to make the present disclosure complete and allow those skilled in the art to completely recognize the scope of the present disclosure, and the present disclosure will be defined by the scope of the claims. Throughout the specification, the same components will be denoted by the same reference numerals.

Accordingly, in some embodiments, well-known process steps, well-known structures, and well-known techniques have not been specifically described in order to avoid obscuring the present invention.

Terms used in the present specification are for explaining embodiments rather than limiting the present disclosure. Unless otherwise stated, a singular form includes a plural form in the present specification. Components, steps, operations, and/or devices described by the terms "comprise" and/or "comprising" used herein do not exclude the existence or addition of one or more other components, steps, operations, and/or devices. "And/or" includes each and every combination of one or more of the mentioned items.

Further, the exemplary embodiments described in the specification will be described with reference to cross-sectional views and/or schematic diagrams that are ideal exemplification figures. Accordingly, forms of the illustrative drawings may be changed due to manufacturing technology, tolerance, and the like. Accordingly, embodiments of the present disclosure are not limited to specific forms illustrated in the drawings, and also include changes in forms generated according to manufacturing processes. In addition, in each drawing illustrated in the present invention, each component may be shown somewhat enlarged or reduced in consideration of convenience of explanation. Throughout the specification, the same components will be denoted by the same reference numerals.

Hereinafter, a logistics smart label, a smart box 200 and a logistics system including the same according to embodiments of the present invention will be described with reference to the drawings.

FIG. 1 is a schematic block diagram of a logistics smart label according to an embodiment of the present invention.

Figure 2:
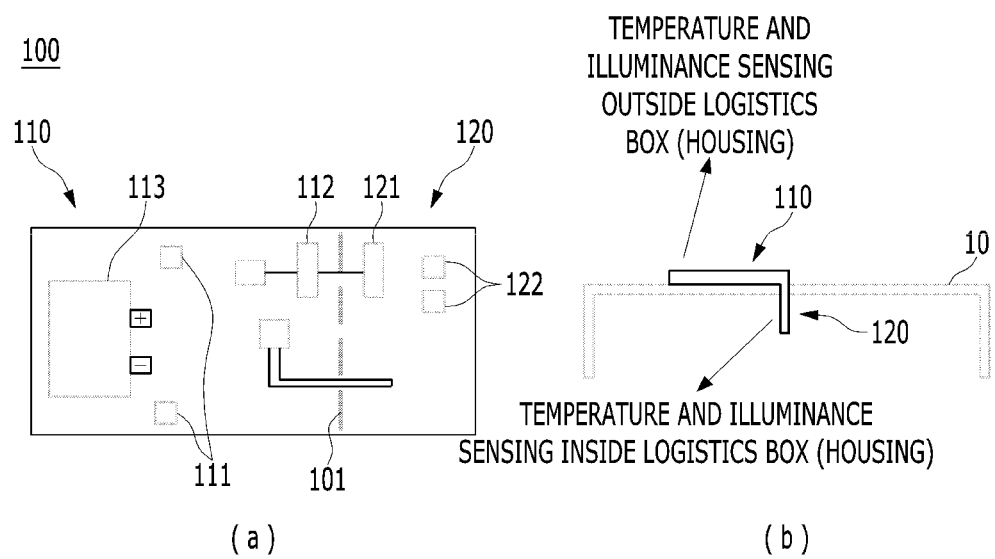
FIG. 2 is a diagram schematically illustrating an embodiment of a logistics smart label according to an embodiment of the present invention.
Figure 2:
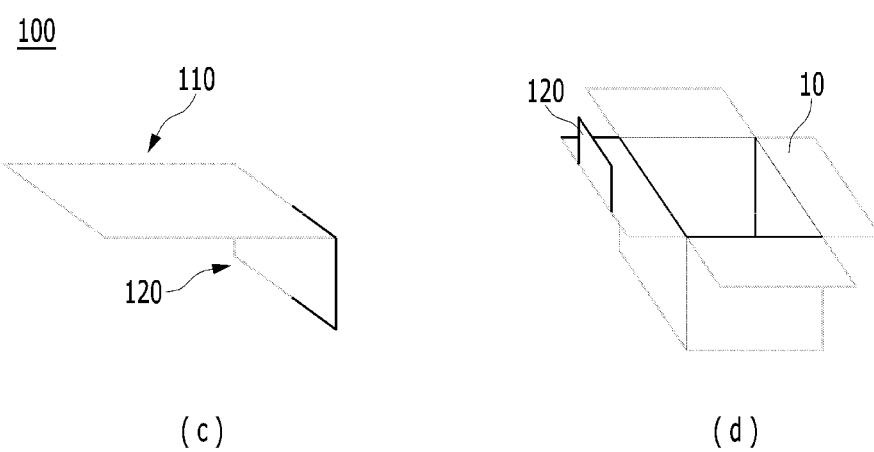

FIG. 2 is a diagram schematically illustrating an embodiment of a logistics smart label according to an embodiment of the present invention.

Figure 3:
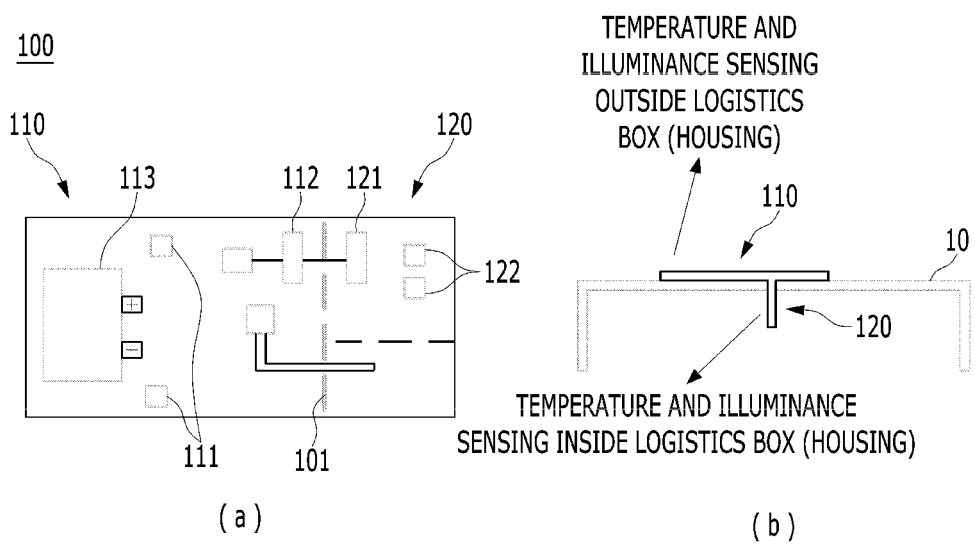
FIG. 3 is a diagram schematically illustrating another embodiment of the logistics smart label according to the embodiment of the present invention.
Figure 3:
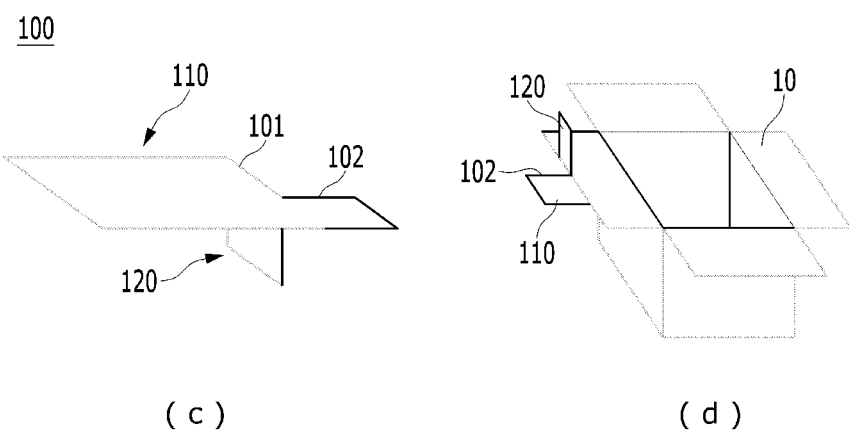

FIG. 3 is a diagram schematically illustrating another embodiment of the logistics smart label according to the embodiment of the present invention.

Figure 4:
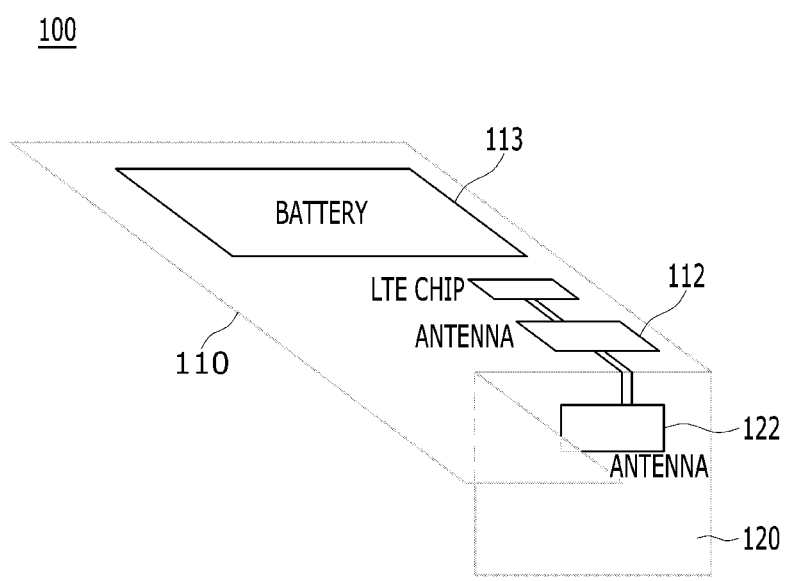
FIG. 4 is a diagram schematically illustrating an antenna location implementing a three-dimensional antenna shape according to folding of the logistics smart label according to the embodiment of the present invention.

FIG. 4 is a diagram schematically illustrating an antenna location implementing a three-dimensional antenna shape according to folding of the logistics smart label according to the embodiment of the present invention.

Referring to FIGS. 1 to 4, the smart label of the present invention may include a smart label member 100.

The smart label member 100 may be provided to be attached to a logistics box 10, specifically, one surface of the logistics box 10, specifically, an upper surface of the logistics box 10. The smart label member 100 may include at least one bending line 101 to be mounted on the outside and inside of the logistics box 10 through bending along the bending line 101.

The smart label member 100 according to the embodiment of the present invention may be provided to be bent along the bending line 101. The smart label member 100 may preferably be provided to be bent at about 90°. The smart label member 100 may be partitioned into an externally mounted label area 110 and an internally mounted label area 120 along the bending line 101.

The externally mounted label area 110 may be mounted on (attached to) the outside of the logistics box 10, specifically, at least one of outer side surfaces of the logistics box 10, preferably, an upper surface of the logistics box 10. At least one first sensor unit 111 and a first antenna 112 may be provided in the externally mounted label area 110. Here, the first sensor unit 111 may include an illuminance sensor 111*a*, a temperature sensor (or a temperature and humidity sensor 111*b*), or/and an acceleration sensor, an impact sensor, and the like.

The externally mounted label area 110 may further include a battery module 113 that may supply power to a second sensor unit 121, a second antenna 122, or the like provided in an internally mounted label area 120 to be described later as well as the first sensor unit 111 or the first antenna 112.

The internally mounted label area 120 may be bent from the externally mounted label area 110 along the bending line 101. In addition, the internally mounted label area 120 may be bent from the externally mounted label area 110 and mounted inside the logistics box 10. At least one second sensor unit 121 and the second antenna 122 connected to the first antenna 112 may be provided in the internally mounted label area 120.

In an embodiment of the present invention, the second sensor unit 121 may include at least one of an illuminance sensor 121*a*, a temperature sensor 121*b*, and/or an impact sensor and/or an acceleration sensor.

Therefore, the first sensor unit 111 may be located outside the logistics box 10, and the second sensor unit 121 may be located inside the logistics box 10. An internal and external temperature difference and illuminance difference of the logistics box 10 may be detected through the first sensor unit 111 and the second sensor unit 121. Values detected by the first sensor unit 111 and the second sensor unit 121 may be applied to a microcontroller unit (MCU) to which the first sensor unit 111 and the second sensor unit 121 are connected. The microcontroller unit may analyze the information, and when the values are a difference greater than or equal to a value set in reference setting, may detect that the logistics box has been stolen. For example, the inflow of light into inside and outside the logistics box 10 may be detected through the illuminance sensor of the first sensor unit 111 and the illuminance sensor of the second sensor unit 121. Depending on the internal and external illumination difference of the logistics box 10, it is possible to determine whether the logistics box 10 is damaged, and whether the logistics box 10 has been stolen. In addition, by comparing the internal and external temperature values of the logistics box 10, it is possible to determine whether the logistics box 10 is damaged or clearly detect that a fire has occurred, according to a change in temperature difference.

That is, when a temperature change rate is greater than the set value in one of the logistics boxes 10 having the smart label member 100, by analyzing the temperature change rate of at least one or more logistics boxes 10 near the logistics box 10, it is possible to detect a fire. For example, the logistics box 10 on which the smart label member 100 is mounted may be provided in a plurality of stacked or collected states such as a logistics warehouse or a logistics delivery vehicle. In this case, the temperature change rate detected from the smart label member 100 provided in at least one logistics box 10 may be greater than or equal to the set value. In this case, the temperature change rate of the logistics box 10 located near the logistics box 10 whose temperature change rate detected in the smart label member 100 is greater than or equal to the set value may be analyzed together. That is, when it is detected that the temperature change rate detected in the smart label member 100 attached to the logistics box 10 near the logistics box 10 on which the smart label member 100 having the temperature change rate greater than or equal to the set value is mounted is greater than or equal to the set value, it is determined that a fire has occurred or a risk of occurrence of fire is high, and it is possible to take quick action. In addition, even if the temperature change rate detected in the smart label member 100 attached to the nearby logistics box 10 is not detected as greater than or equal to the set value, in the case of the logistics box 10 whose temperature change rate is greater than or equal to the set value, the risk of fire may be observed in real time, and as a result, it is possible to prevent a fire.

Here, the temperature change rate through the smart label member 100 may be detected according to Equation 1 below.

Temperature change rate=current temperature difference $D T_P$-initial temperature difference $D T_0$, ($D T$=external temperature $T_{out}$-internal temperature $T_{in}$) [Equation 1]

In addition, as illustrated in FIG. 4, the first antenna 112 may be provided in the externally mounted label area 110, and the second antenna 122 may be provided in the internally mounted label area 120 bent from the externally mounted label area 110 in a direction perpendicular to the first antenna 112. Accordingly, when the smart label member 100 is attached to the logistics box 10 while being bent along a cutout line 101, antennas may be formed in a three-dimensional shape. For this reason, the communication performance of the antenna may be improved compared to the structure in which the antenna is formed only on a plane (only two-dimensionally). For example, when the antennas are arranged only in two dimensions, multi-band implementation, specifically, 800 to 900 Mhz low band performance, is weak. In the present invention, as the first antenna 112 and the second antenna 122 are arranged in three dimensions, it is possible to compensate for the weakness of the band performance.

In addition, when the logistics box 10 on which the smart label member 100 is mounted is loaded onto a delivery vehicle or the like and moved, a logistics vehicle is loaded with a plurality of logistics boxes 10 (mounted with the smart label member 100), it is possible to collect location information through the smart label members 100 attached to each logistics box 10 and average the collected location information to secure the accuracy of the location information.

In addition, a configuration in which the smart label member 100 is partitioned into two through the bending line 101 as illustrated in FIG. 2 will be described by way of example.

Alternatively, as illustrated in FIG. 3, a cutout part 102 cut from a predetermined location of the bending line 101 to the other end of the smart label member 100 may be provided. Accordingly, one of an upper surface and a lower surface of the cutout part 102 partitioned by the cutout part 102 may be provided as the internally mounted label part while the smart label member 100 is cut from the bending line 101 to the other end in one direction with the cutout part 102 as the center. In addition, the other of the upper surface and the lower surface of the cutout part 102 partitioned by the cutout part 102 may be bent from the bending line 101 to be provided as the internally mounted label part.

Figure 5:
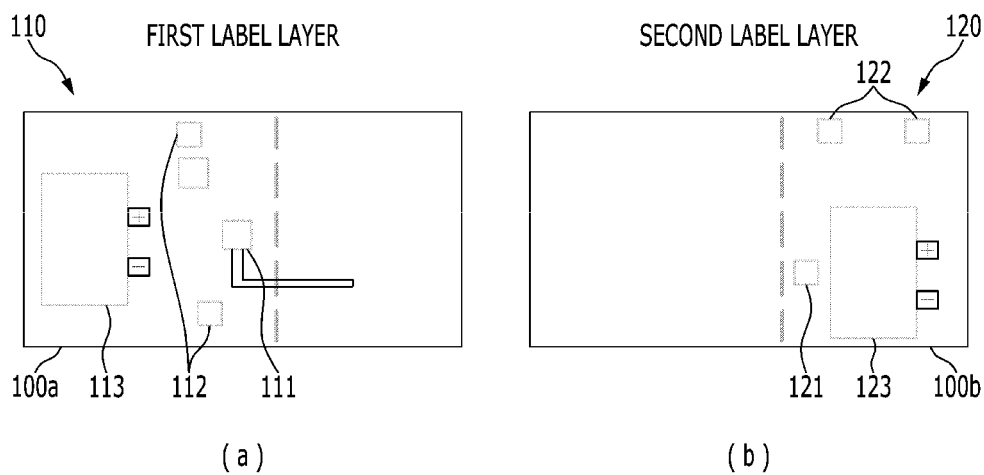
FIG. 5 is a diagram schematically illustrating another stacked structure of the logistics smart label according to an embodiment of the present invention.
Figure 5:
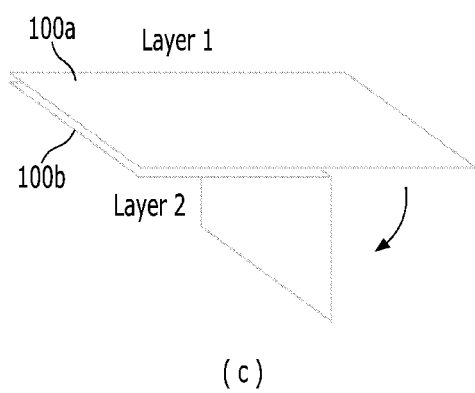

FIG. 5 is a diagram schematically illustrating another stacked structure of the logistics smart label according to an embodiment of the present invention.

Figure 6:
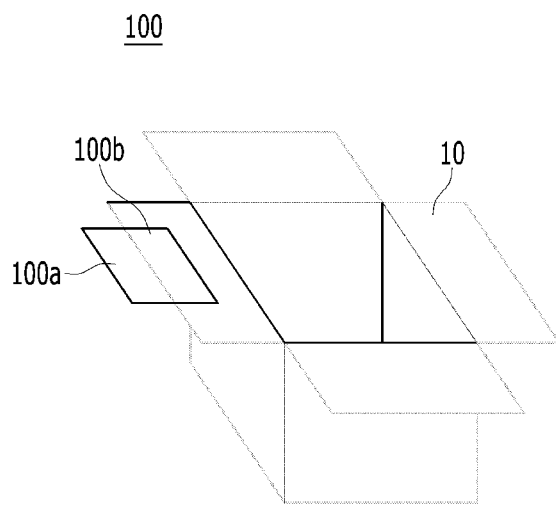
FIG. 6 is a diagram schematically illustrating a state in which the logistics smart label of FIG. 5 is mounted on a logistics box.
Figure 6:
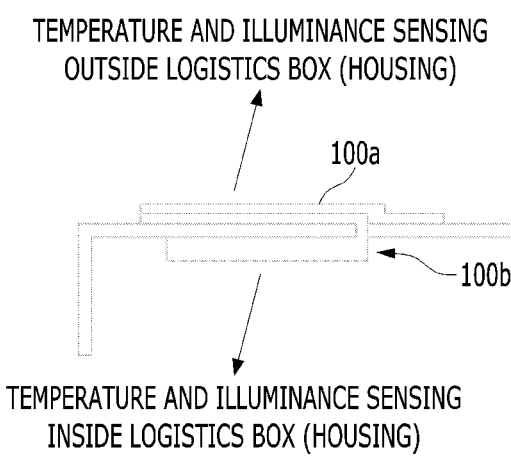

FIG. 6 is a diagram schematically illustrating a state in which the logistics smart label of FIG. 5 is mounted on the logistics box 10.

Referring to FIGS. 5 and 6, the smart label member 100 according to the embodiment of the present invention may include a layer 100*a* of a first label 210 and a layer 100*b* of a second label 220.

The layer 100*a* of the first label 210 may be attached to be exposed on the outside of the logistics box 10. Specifically, one side of the layer 100*a* of the first label 210 may form the externally mounted label area 110 along the bending line 101, and the other side of the layer 100*a* of the first label 210 may be attached to the outer side surface of the logistics box 10. That is, the first sensor unit 111, the first antenna 112, and the battery module may be mounted on one side of the layer 100*a* of the first label 210.

The layer 100*b* of the second label 220 is configured to be stacked and attached to a lower surface of the layer 100*a* of the first label 210, and may be formed to be partitioned into two compartments along the bending line 101.

The layer 100*b* of the second label 220 is bent along the bending line 101, so that one side may be located on the lower surface of the first label layer 100*a* and the other side may be located inside the logistics box 10. Specifically, the one side of the layer 100*b* of the second label 220 may be stacked on the lower surface of the first label layer 100*a* while attached to the outer side surface of the logistics box 10. The other side of the layer 100*b* of the second label 220 may be bent along the bending line 101 to be located inside the logistics box 10 and to form the internally mounted label area 120. That is, the second sensor unit 121, the second antenna 122, and a separate additional battery module 123 may be mounted on the other side of the second label layer 100*b*.

The other side of the second label layer 100*b* may be formed vertically by being bent from one side of the first label layer 100*a* along the bending line 101, and may be attached to an inner lower surface of the open cover of the logistics box 10.

As the smart label member 100 includes the first label layer 100*a* and the second label layer 100*b*, the battery module 113 may be mounted on the first label layer 100*a*. Of course, an additional battery module 123 may also be mounted on the second label layer 100*b* to extend the operation time of the smart label member 100.

Figure 7:
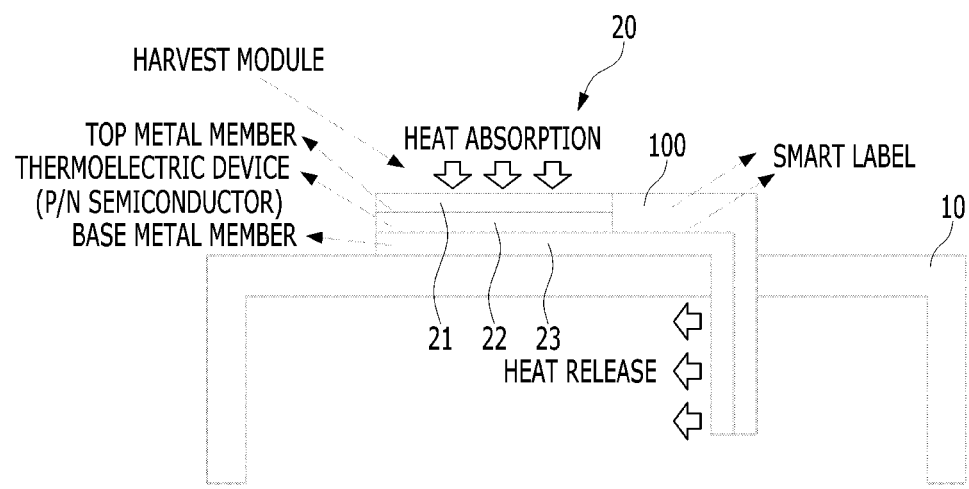
FIG. 7 is a diagram schematically illustrating a smart label including a harvest module and a mounting state of the smart label according to an embodiment of the present invention.

FIG. 7 is a diagram schematically illustrating a smart label including a harvest module 20 and a mounting state of the smart label according to an embodiment of the present invention.

Figure 8:
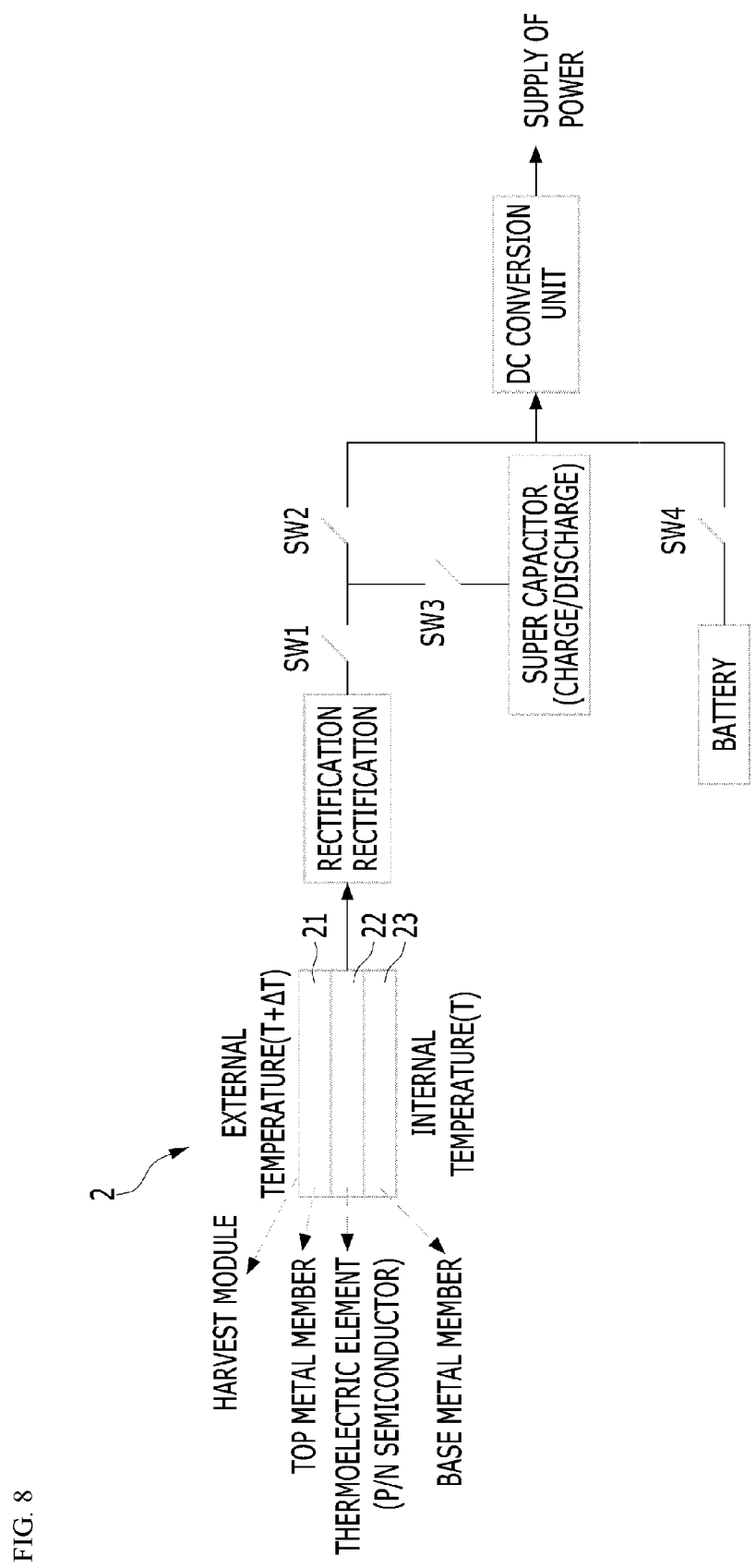
FIG. 8 is a block diagram schematically illustrating supply of power according to a harvest module in an embodiment of the present invention.

FIG. 8 is a block diagram schematically illustrating a supply of power according to the harvest module 20 in an embodiment of the present invention.

Figure 9:
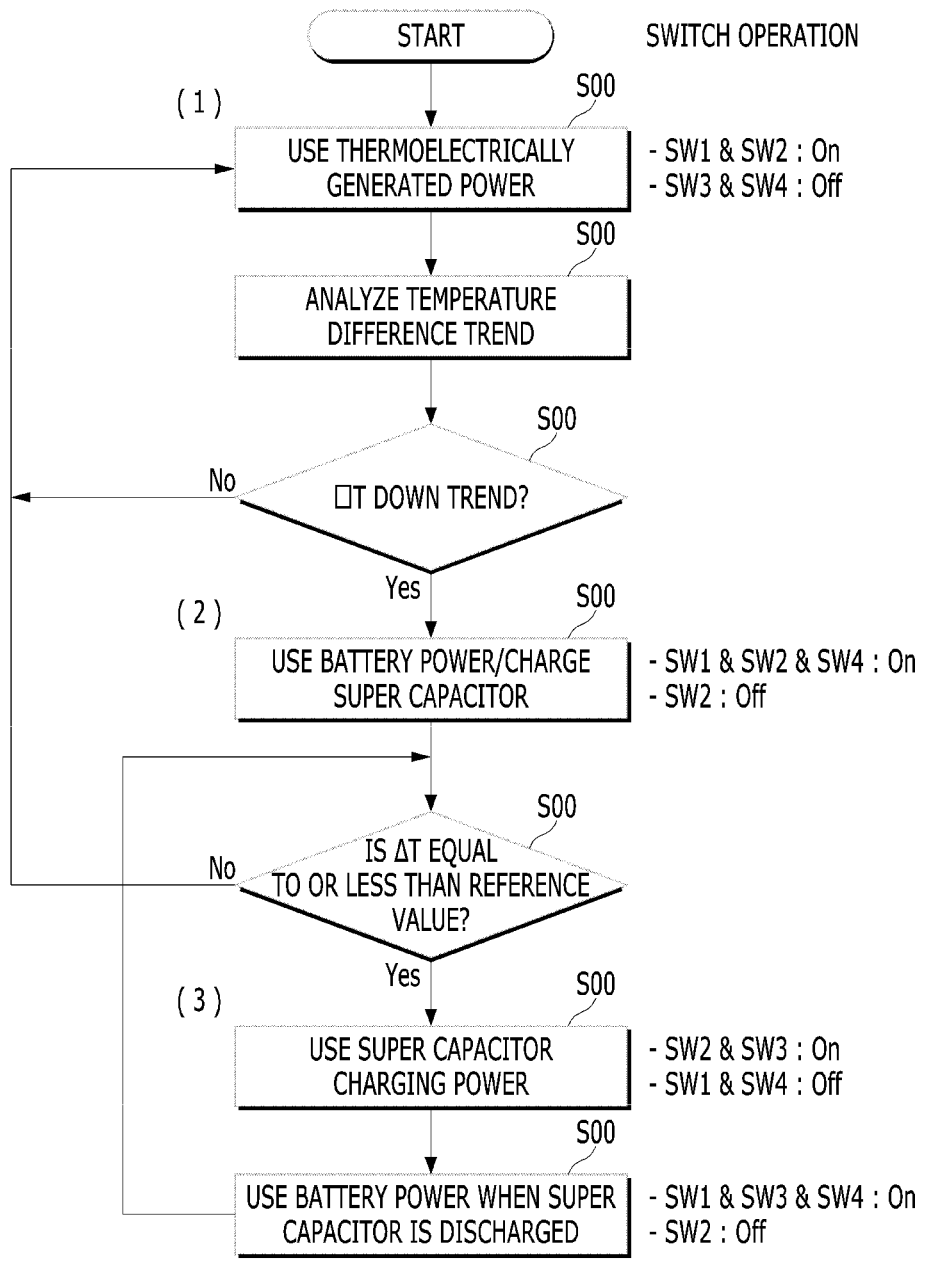
FIG. 9 is a flowchart of the supply of power according to the harvest module in the embodiment of the present invention.

FIG. 9 is a flowchart of the supply of power according to the harvest module in the embodiment of the present invention.

Figure 10:
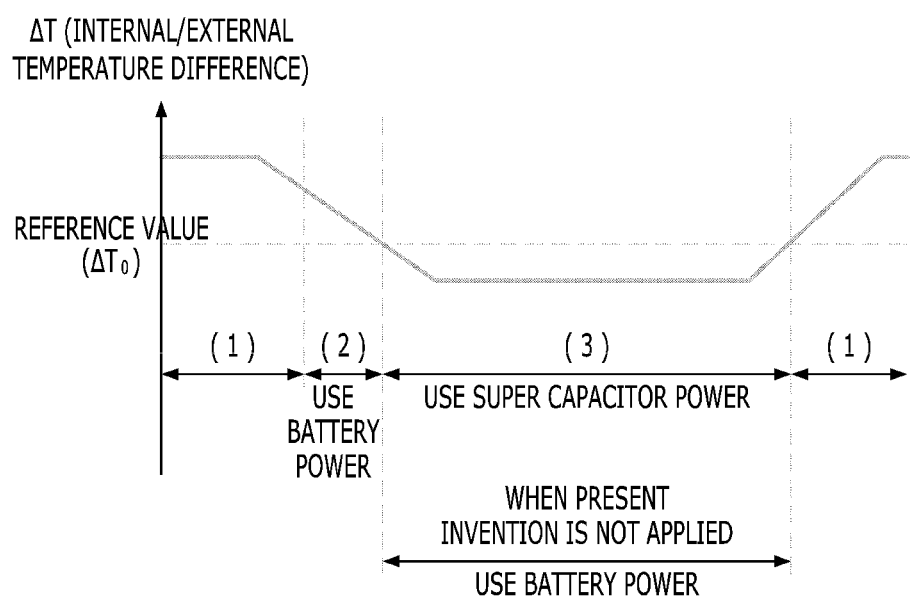
FIG. 10 is a graph schematically illustrating use of power of the harvest module in the embodiment of the present invention.

FIG. 10 is a graph schematically illustrating use of power of the harvest module 20 in the embodiment of the present invention.

Referring to FIGS. 7 to 10, the smart label may further include the harvest module 20 that generates power through the internal and external temperature difference of the housing 201. For example, the harvest module 20 may be applied to a logistics box 10 when the logistics box 10 is a cold box, that is, the internal temperature is to be maintained at a lower temperature than the external temperature. That is, the harvest module 20 may be provided to supply power to the smart label member 100 while heat is released from the outside to the inside of the logistics box due to the temperature difference between the outside having a relatively high temperature and the inside having a relatively low temperature of the logistics box 10 and the thermoelectric device 22 generates power.

Specifically, the harvest module 20 may include a base member 23, a top member 21 and the thermoelectric device 22.

The base member 23 may be made of a metal material and bent along a bending line 101 corresponding to the bending line 101. One surface of the base member 23 may be mounted on the ouster side surface of the logistics box 10 along the bending line 101, and the other side may be bent 90° from the one side and mounted inside the logistics box 10. The smart label member 100 may have a structure that is stacked onto the other surface of the base member 23 from a predetermined position on one surface of the base member 23. The base member 23 may be provided to release heat received by the top member 21 to the inside of the logistics box 10, which will be described later.

The top member 21 is stacked on one side of the base member 23 and may be positioned adjacent to the smart label member 100. The top member 21 may be made of a metal material to absorb external heat.

The thermoelectric device 22 may be stacked between the base member 23 and the top member 21 adjacent to the smart label member 100. The thermoelectric device 22 may be provided to generate power according to the internal and external temperature difference of the logistics box 10.

As the heat absorbed by the top member 21 is released to the base member 23, power may be generated from the thermoelectric device 22. In the present invention, the harvest module 20 may have a structure connected by four first to fourth switches to supply power to the battery module 113 or/and 123 or supply power to the first sensor unit 111, the first antenna 112, the second sensor unit 121, the second antenna 122, and the like.

That is, the first switch, the second switch, and the fourth switch may have a structure connected in series to directly transfer power to the battery module. In addition, the third switch may be connected in series to the first switch and a super capacitor between the first switch and the second switch.

Therefore, in the case of implementing power generation through the thermoelectric device 22, the temperature difference between the external temperature and the internal temperature needs to be greater than or equal to a reference value. That is, referring to FIG. 10, the thermoelectric device 22 may supply power in area 1 of FIG. 10. Referring to FIG. 9 together with FIG. 10, when the internal and external temperature difference of the logistics box 10 is maintained constant at a value greater than or equal to a reference value, the first switch and the second switch are turned on, and the third switch and the fourth switch are turned off, so that the thermoelectric generation power may be used in area 1.

In this state, when the external and internal temperature difference of the logistics box 10 forms a down trend, the first switch, the third switch, and the fourth switch are turned on, and the second switch is turned off, so that charging is performed through the super capacitor while the battery module is in use. As a result, as in area 2 of FIG. 10, power may be supplied by the battery module and the thermoelectric device 22.

In addition, when the external and internal temperature difference of the logistics box 10 is less than or equal to the reference value, in area 3 of FIG. 10 where the external and internal temperature difference is less than or equal to the reference value, power cannot be generated by the thermoelectric device 22, and power needs to be provided by a separate battery module. Therefore, the second switch and the third switch are turned on, and the first switch and the fourth switch are turned off to use the charging power of the super capacitor, but when the super capacitor is discharged, the use of power is implemented by the battery module.

Hereinafter, the smart box 200 may be described in detail with reference to FIGS. 11 and 12. Here, for descriptions of configurations or structures similar to those of the above FIGS. 1 to 10, the above description may be referred to again.

Figure 11:
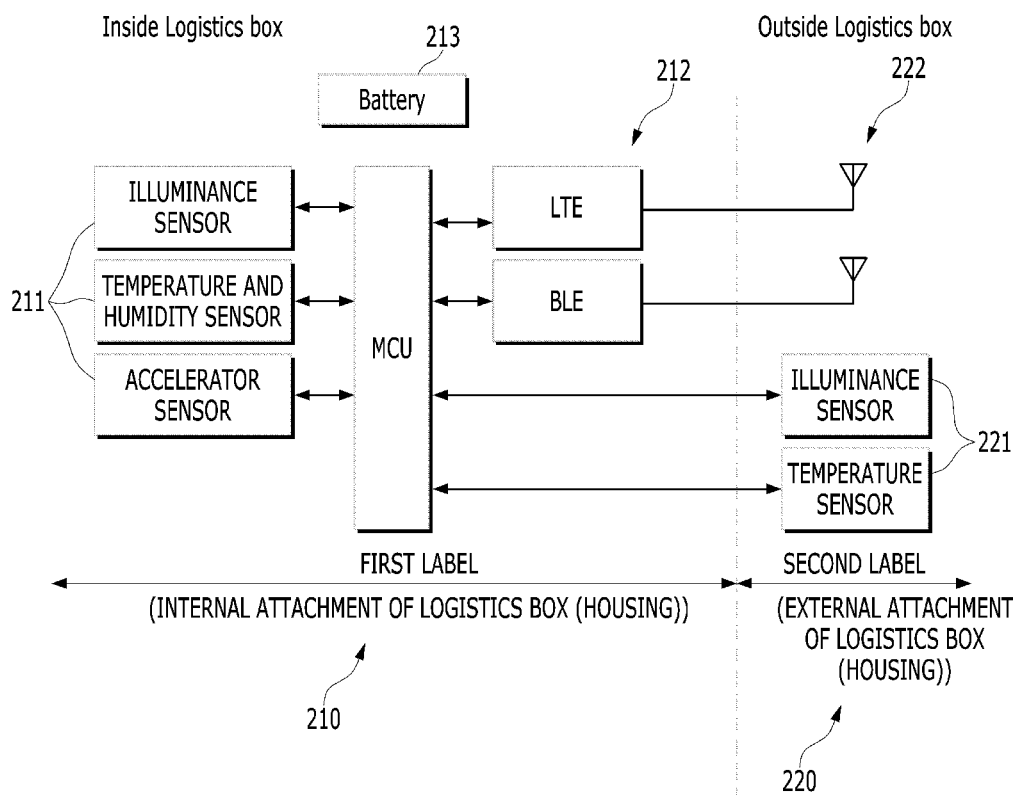
FIG. 11 is a block diagram schematically illustrating a smart box according to an embodiment of the present invention.

FIG. 11 is a block diagram schematically illustrating a smart box 200 according to an embodiment of the present invention.

Figure 12:
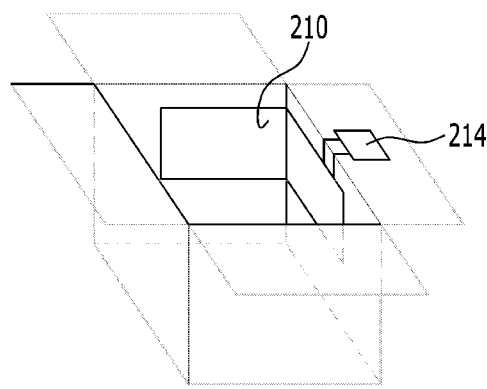
FIG. 12 is a diagram schematically illustrating the smart box according to the embodiment of the present invention.
Figure 12:
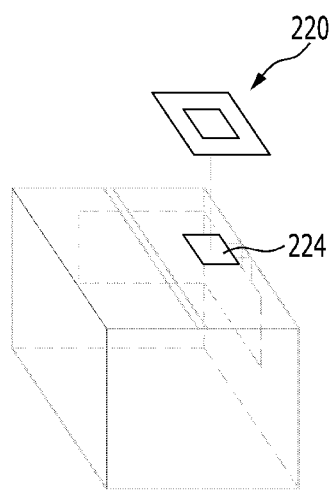

FIG. 12 is a diagram schematically illustrating the smart box 200 according to the embodiment of the present invention.

Referring to FIGS. 11 and 12, the smart box 200 according to the embodiment of the present invention may include a housing 201 housing articles and a smart label mounted on the housing 201.

Here, the smart label may include the first label 210 and the second label 220.

The first label 210 may be mounted on an outer side surface of the housing 201, and may include at least one first sensor unit 211, a first antenna 212, and a connector 214.

The second label 220 may be mounted on an inner surface of the housing 201. The second label 220 includes at least one second sensor unit 221 inside the housing 201, a second antenna 222 connected to the first antenna 212, and a connection connector 224 connected to the connector 214.

The smart label may include the battery module 213 that may provide power to components (the first sensor unit 211 and the first antenna 212, etc.) included in the first label 210 and components (the second sensor unit 211, the second antenna 222, etc.) included in the second label 220.

The battery module 213 may be provided on at least one of the first label 210 and the second label 220.

Similar to the embodiment described above with reference to FIGS. 1 to 10, the first sensor unit 211 may include an illuminance sensor and a temperature sensor, and the second sensor unit 221 may include at least one of a temperature and humidity sensor, an illuminance sensor, an impact sensor, and/or an acceleration sensor.

Therefore, the first sensor unit 211 may be located inside the housing 201, and the second sensor unit 221 may be positioned outside the housing 201. By detecting and analyzing the internal and external temperature difference and illuminance difference of the housing 201 through the first sensor unit 211 and the second sensor unit 221, it is possible to detect theft when the temperature difference is greater than or equal to the value set in the reference setting. This has been described above, and therefore that description maybe referred to again.

In addition, in the embodiment of the present invention, as in the above-described embodiment, the smart label may further include the harvest module 20 that generates power through the internal and external temperature difference of the housing 201.

In the present invention, the harvest module 20 may have a difference from the above-described embodiment in terms of the structure in which the harvest module 20 is stacked and mounted on the first label 210 provided on the outside of the housing 201. Therefore, the difference in the mounting position and structure may be described in detail, and for the descriptions of the same functions, structures, configurations, etc., the description of the above-described embodiment may be referred to again.

The harvest module 20 according to the embodiment of the present invention may include the base member 23, the top member 21, and the thermoelectric device 22.

The base member 23 may be made of a metal material and may be provided to be bent along the bending line 101. One surface of the base member 23 partitioned by the bending line 101 may be mounted on the upper surface of the housing 201, and the first label 210 may be mounted on the upper surface of the housing 201. Also, the other surface of the base member 23 may be mounted inside the housing 201 along the bending line 101. As the other surface of the base member 23 is mounted on the inside of the housing 201, heat outside the top member 21 to be described below may be released to the inside of the housing 201 through the other surface of the base member 23.

The top member 21 may be made of a metal material and may be stacked on the upper surface of the base member 23. The top member may be exposed on the outside to receive the external heat.

The thermoelectric device 22 may be disposed between the base member 23 and the top member 21. The thermoelectric device 22 may be provided to generate power according to the internal and external temperature difference of the logistics box 10.

The power generation and power use by the harvest module 20 has been described above, and therefore the above description may be referred to again.

Figure 13:
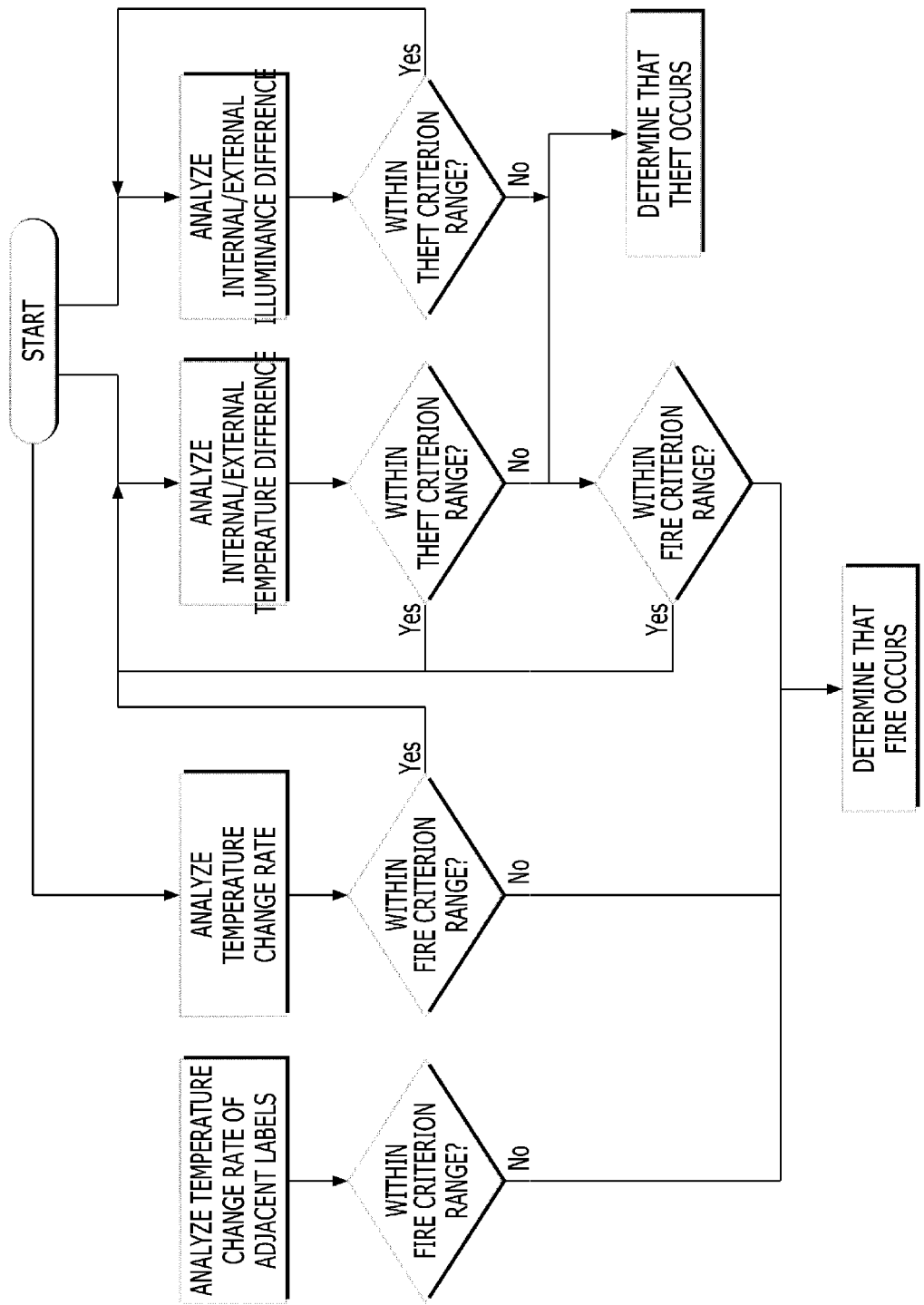
FIG. 13 is a flowchart schematically illustrating fire or theft determination in a logistics system according to a smart label or a smart box in an embodiment of the present invention.

FIG. 13 is a flowchart schematically illustrating fire or theft determination in a logistics system according to the smart label or the smart box 200 in an embodiment of the present invention.

Referring to FIG. 13, in the logistics system according to the embodiment of the present invention, it is possible to determine a fire or theft through the smart label or the smart box 200.

Specifically, the first sensor unit 111 and the second sensor unit 121 respectively including the illuminance sensor and the temperature sensor are mounted on the inside and outside of the logistics box 10 (meaning the same as the "housing 201" of the smart box 200, hereinafter collectively referred to as "logistics box 10").

The internal and external temperature difference and illuminance difference of the logistics box 10 may be detected and analyzed through the temperature sensor or the illuminance sensor mounted on the inside and outside of the logistics box 10, respectively.

It is determined whether the internal/external temperature difference or/and the internal/external illuminance difference is within the theft criterion range. Here, when the internal/external temperature difference or/and the internal/external illuminance difference is smaller than the theft criterion range (within the theft criterion range), it is determined that no theft has occurred, and when the internal/external temperature difference or/and the internal/external illuminance difference is greater than the theft criterion range (outside the theft criterion range), it is determined that theft has occurred.

That is, as described above, if the internal/external temperature difference or/and the internal/external illuminance difference is greater than or equal to the theft criterion range, it is determined that a theft has occurred.

Here, after it is determined that theft has occurred because the internal/external temperature difference is greater than or equal to the theft criterion range, it is further determined whether the temperature change rate is within the fire criterion range. When the internal/external temperature difference corresponds to the temperature change rate out of the fire criterion range, it is determined that a fire has occurred or there is a risk of fire.

In addition, the temperature sensor mounted on the inside and outside of the logistics box 10 may analyze the temperature change rate in real time. When the temperature change rate is within the fire criterion range, it is a normal situation, but when the temperature change rate is out of the fire criterion range, it may be determined that a fire has occurred or there is a risk of fire.

In addition, when the temperature change rate between the inside and outside of the logistics box 10 is out of the fire criterion range, the temperature change rate between the inside and outside of the internal external temperature of the nearby logistics box 10 may also be determined together, and when the temperature change rate between the inside and outside of the nearby logistics box 10 is out of the first criterion range, it may be determined that a fire has occurred.

As described above, the logistics smart label, smart box, and logistics system including the same according to an embodiment of the present invention can analyze an internal and external temperature difference and illuminance difference of a logistics box to detect that the logistics box is stolen when the temperature difference and the illuminance difference are out of a reference range.

In addition, the logistics smart label, smart box, and logistics system including the same according to the embodiment of the present invention can detect whether a fire occurs by comparing an internal temperature sensing value and an external temperature sensing value in a logistics box and a temperature value of a logistics box near the logistics box to improve the reliability of fire monitoring, and may be used for fire detection and suppression in a logistics warehouse including a logistics box when a fire extinguishing sheet is stacked on the smart label.

In addition, the logistics smart label, smart box, and logistics system including the same according to the embodiment of the present invention can implement an antenna in a three-dimensional shape using folding of the smart label to implement antenna performance.

In addition, the logistics smart label, smart box, and logistics system including the same according to the embodiment of the present invention can improve the performance of an antenna to average location information of the smart label, thereby improving the location accuracy.

Further, the logistics smart label, smart box, and logistics system including the same according to the embodiment of the present invention can include a harvest module to maximize an operation time of the smart label through an internal and external temperature difference of a logistics box.

The effects of the present invention are not limited to the above-described effects, and other effects that are not mentioned may be obviously understood by those skilled in the art from the claims.

The exemplary embodiments of the present disclosure have been described hereinabove with reference to the accompanying drawings, but it will be understood by one of ordinary skill in the art to which the present disclosure pertains that various modifications and alterations may be made without departing from the technical spirit or essential features of the present disclosure. Therefore, it should be understood that the above-described embodiments are exemplary in all aspects and not limiting.

What is claimed is:

1. A smart label, comprising:
    a smart label member that is mounted on a logistics box, provided with at least one bending line, and mounted on an outside and inside of the logistics box through bending along the bending line,
    wherein the smart label member is partitioned along the bending line into an externally mounted label area that is mounted outside the logistics box and includes at least one first sensor unit and a first antenna, and an internally mounted label area that is bent along the bending line to be mounted inside the logistics box, and includes at least one second sensor unit and a second antenna connected to the first antenna,
    wherein the smart label further includes a harvest module that generates power through an internal and external temperature difference of the housing, and the harvest module further includes:
    a base member made of a metal material that has one surface mounted on an outer side surface of the logistics box along a bending line corresponding to the bending line and the other surface mounted inside the logistics box and having the smart label member bent and mounted thereon from a predetermined location on the one surface to the other surface;
    a top member of a metal material that is located on the one surface of the base member and is laminated on an upper surface of the base member adjacent to the smart label member; and
    a thermoelectric device that is provided between the base member and the top member to generate power according to an internal and external temperature difference of the logistics box.

2. The smart label of claim 1, wherein a battery module providing power is mounted on the smart label member.

3. The smart label of claim 2, wherein the smart label member includes a first label layer that is attached to be exposed on the outside of the logistics box, and has one side forming the externally mounted label area along the bending line and the other side attached to an outer side surface of the logistics box, and
    a second label layer that is formed to be partitioned into two compartments along the bending line, and
    the second label layer has one side stacked on a lower surface of the first label layer along the bending line, and the other side bent while forming the internally mounted label area along the bending line and located inside the logistics box.

4. The smart label of claim 3, wherein the other side of the second label layer is bent at one side of the label layer along the bending line and attached to an inner lower surface of an open cover of the logistics box.

5. The smart label of claim 3, wherein the first label layer is detachably provided on the second label layer.

6. The smart label of claim 1, wherein the first sensor unit includes an illuminance sensor and a temperature sensor, and
    the second sensor unit includes at least one of a temperature and humidity sensor, an illuminance sensor, an impact sensor, and/or an acceleration sensor.

7. The smart label of claim 1, further comprising:
    a cutout part that is cutout from a predetermined location of the bending line to the other end of the smart label member,
    wherein one of upper or lower surfaces partitioned by the cutout part is provided as the externally mounted label unit, and
    the other of the upper or lower surfaces partitioned by the cutout part is provided as the internally mounted label unit.

8. The smart label of claim 1, wherein, when a temperature change rate in one of the logistics boxes having the smart label is equal to or greater than a set value, a fire is detected by analyzing temperature change rates of at least one or more logistics boxes near the logistics box.

9. A smart box, comprising:
    a housing that houses goods and a smart label that is mounted on the housing,
    wherein the smart label includes a first label that is mounted on an outer side surface of the housing and includes at least one first sensor unit, a first antenna, and a connector, and
    a second label that is mounted on an inner side surface of the housing, and includes at least one second sensor unit inside the housing, a second antenna connected to a first antenna, and a connection connector connected to the connector, wherein the smart label further includes a harvest module that generates power through an internal and external temperature difference of the housing, and the harvest module includes:

a base member made of a metal material that is bent along a bending line, and has one surface mounted on an upper surface of the housing, a first label mounted on the upper surface thereof, and the other surface mounted inside the housing;

a top member made of a metal material that is stacked on the upper surface of the base member; and a thermoelectric device that is provided between the base member and the top member to generate power according to an internal and external temperature difference of the logistics box.

10. The smart box of claim 9, wherein a battery module is further provided on the second label.

11. The smart box of claim 9, wherein the first sensor unit includes at least one of a temperature and humidity sensor, an illuminance sensor, an impact sensor, and/or an acceleration sensor, and the second sensor unit includes the illuminance sensor and the temperature sensor.

* * * * *